United States Patent Office 2,893,974
Patented July 7, 1959

2,893,974

COMPOSITIONS OF 4,4 BIS(HYDROXYARYL) PENTA-n-AMIDE-ETHER ACIDS AND POLY-EPOXIDES

Sylvan O. Greenlee, Racine, Wis., assignor to S. C. Johnson & Son, Inc., Racine, Wis.

No Drawing. Application November 7, 1956
Serial No. 620,815

11 Claims. (Cl. 260—47)

This invention relates to new compositions resulting from the reaction of polyepoxides and a new class of polycarboxylic acids. More particularly, the polycarboxylic acids are acids derived from bis(hydroxyaryl)-substituted acid amides and a monosubstituted aliphatic carboxylic acid.

An object of this invention is the formulation of admixtures of a polyepoxide and polycarboxylic acids which, on further reaction, form insoluble, infusible compositions and products.

Another object of this invention is the formulation of polyepoxide and polycarboxylic-acid compositions which are hard, extremely tough products possessing good chemical and water resistance.

Another object of this invention is the formulation of compositions and intermediate reaction products of polyepoxides and polycarboxylic acids which are stable at ordinary temperatures for long periods of time, yet may be polymerized to insoluble, infusible products with or without the addition of catalyst by the application of heat.

Other objects of the invention will appear from the following more detailed description with particular reference to the specific illustrative examples.

In the formulation of insoluble, infusible, heat conversion products from polyepoxides, one of the problems encountered is that of choosing satisfactory co-reactance to couple with the epoxy groups to give the desired cross-linking and the desired properties to the final product. Ingredients which have been found to interreact with polyepoxide compositions include certain dicarboxylic acids, which contain active hydrogens attached to the carboxyl group, and certain amides, which have active hydrogens attached to the nitrogen of the amide group.

The subject polycarboxylic acids have been found to be an outstanding co-reactant with polyepoxides. These polycarboxylic acids are fully described in the Greenlee copending application entitled "Polycarboxylic Acid Amides," Serial No. 610,383, filed September 17, 1956, and are the resultant product of a bis(hydroxyaryl)-substituted acid with either an amine or ammonia and is then subsequently reacted with a mono-substituted aliphatic organic acid. Such polycarboxylic acids have present in the same molecule at least two carboxylic acid groups, and in instances where a primary amine or ammonia is used, at least one active hydrogen attached to a nitrogen. These acids have, in addition, a chemical structure which is readily miscible with commercial polyepoxide resins. Thus, due to their configuration, aliphatic and aromatic character, and high degree of stability, such acids have been found to render particularly valuable products when co-reacted with epoxides. Besides contributing polyfunctionality, they contribute to the resinous character of the resultant products and supplement greatly the hardness, toughness, gloss, and chemical resistance of the co-conversion mixtures with the epoxides. The chemical structure of these polycarboxylic acids may be represented by the reaction products of a monohalo carboxylic acid with an amide of a hydroxyaryl-substituted alkylidene monocarboxylic acid. Such acid amides are obtained by the reaction of ammonia or an ammonia derivative, i.e. an amine with 4,4-bis(4-hydroxyphenyl)pentanoic acid. Polycarboxylic acids, obtained by reacting said aryloxy acid with ammonia, n-butylamine, ethylenediamine, and their subsequent reaction with monochloroacetic acid, are illustrated by the following structural formulas:

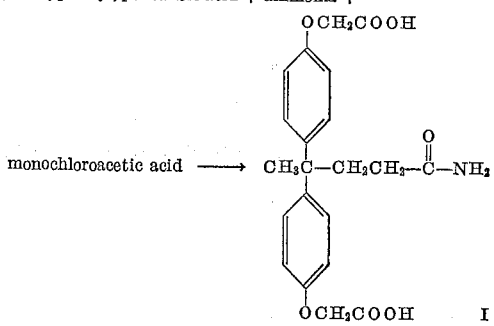

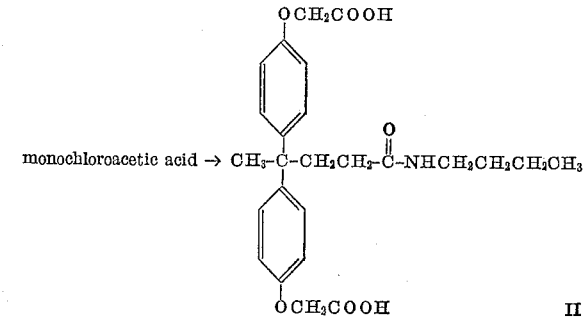

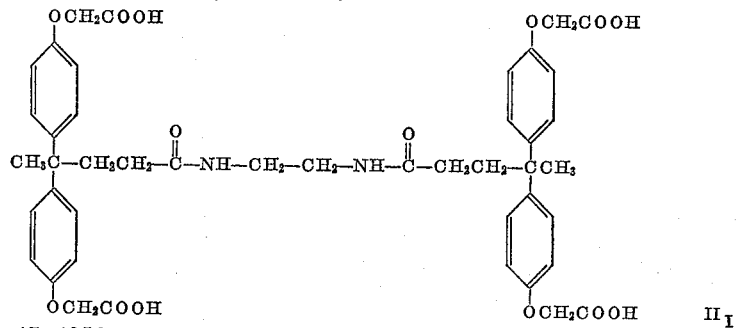

The hydroxyaryl-substituted alkylidene carboxylic acid contemplated for use herein should have two hydroxyaryl groups attached to a single carbon atom. The preparation of such an aryloxy acid is most conveniently carried out by condensing a keto-acid with the desired phenol. Experience in the preparation of bisphenol and related compounds indicates that the carbonyl group of the keto-acid should be positioned next to a terminal methyl group in order to obtain satisfactory yields. Prior applications, Serial Nos. 464,607 and 489,300, filed October 25, 1954, and February 18, 1955, respectively, disclose a number of illustrative compounds suitable for use as the Diphenolic Acid and methods of preparing the same. These materials, which are referred to for convenience as Diphenolic Acid or DPA, consist of the condensation products of levulinic acid and phenol, substituted phenols, or mixtures thereof. It is to be understood that the phenolic nuclei of the Diphenolic Acid may be substituted with any groups which will not interfere with the reactions contemplated herein. For example, the nuclei may be alkylated with alkyl groups of from 1–5 carbon atoms as disclosed in my copending application Serial No. 489,300 or they may be halogenated. The Diphenolic Acid derived from substituted phenols, such as the alkylated phenols, are sometimes more desirable than the products obtained from unsubstituted phenols since the alkyl groups provide better organic solvent solubility, flexibility, and water resistance. However, the unsubstituted product is usually more readily purified.

Ammonia and a large number of amines are suitable for use in preparing the amides of the aryloxy acids which are subsequently reacted to form the subject polycarboxylic acids. The amines may be aliphatic, aromatic, saturated and unsaturated mono- and polyamines. Such amines may be substituted with other functional groups or unsubstituted. It is necessary only that the amine used contain at least one primary or secondary amino group and that the substituted materials contemplated are those which do not tend to interfere with the reaction of the amino group of the amine or the carboxyl group of the hydroxyaryl-substituted aliphatic acid. The aliphatic monoamines and polyamines may be low molecular weight or high molecular weight compounds. Illustrative monoamines include such materials as the saturated amines: methylamine, di-methylamine, ethylamine, diethylamine, propylamine, n-propylamine, di-n-propylamine, butylamine, amylamine, hexylamine, laurylamine, stearylamine, and unsaturated amines such as allylamine, diallylamine, octadecadienylamine, etc. Typical polyamines are ethylenediamine, triethylenediamine, propylenediamine 1,2-tetramethylenediamine, hexamethylenediamine, diethylenediamine, triethylenetetramine, the polyamines derived from polymerized fatty acids such as dimer acids of linseed fatty acids, soyabean fatty acids, and the polyamines obtained from high molecular weight glycols. Operable aromatic amines include mononuclear, fused and non-fused polynuclear mono- and polyamines. Illustrative compounds are p-phenylenediamine, aminobenzyl-phenyleneamine, toluene-2,4-diamine, 3,3'-bitolylene, 4,4-diamine, 2,6-diaminopyridine, aniline, naphthylamine, etc. Other operable amines are the resinous amines, such as the monoamine prepared by replacing the carboxyl group of abietic acid with an amino group. The characteristics of the final reaction product of the amines and the aryloxyl carboxylic acids are dependent to a large extent on the selection of the amine to be used. For example, if a long-chain amine is used, the flexibility is greater than with a short-chain amine or ammonia, whereas the latter imparts increased hardness. For this reason, the end use of the composition must be considered in selecting the proper amine to be reacted with the bis(hydroxyaryl)substituted alkylidene carboxylic acid. The number of amino groups present should be limited to about 4, since more than this number would probably result in highly complex products having limited solvent solubility.

The carboxylic groups can be coupled to the Diphenolic Acid amides to form polycarboxylic acids through reaction with substituted acids which contain up to about 8 carbon atoms and a single functional group which is capable of reacting with phenolic hydroxyl groups to form an ether. One class of such compounds is the monohalo acids. With this type, the reaction is carried out in an alkaline medium with enough alkali present to neutralize the carboxyl group of the monohalo acid and to form an alkali phenoxide with the phenolic hydroxyl groups of the Diphenolic Acid amide. Under these conditions, the alkali phenoxide will react with the monohalo acid to form an ether linkage. The reaction may be illustrated by the following formula representing the reaction of 1 mol of the amide obtained from the reaction of 1 mol of N butylamine and 1 mol of 4,4-bis(4-hydroxyphenyl)-pentanoic acid with 2 mols of monochloroacetic acid through the well-known Williamson ether synthesis.

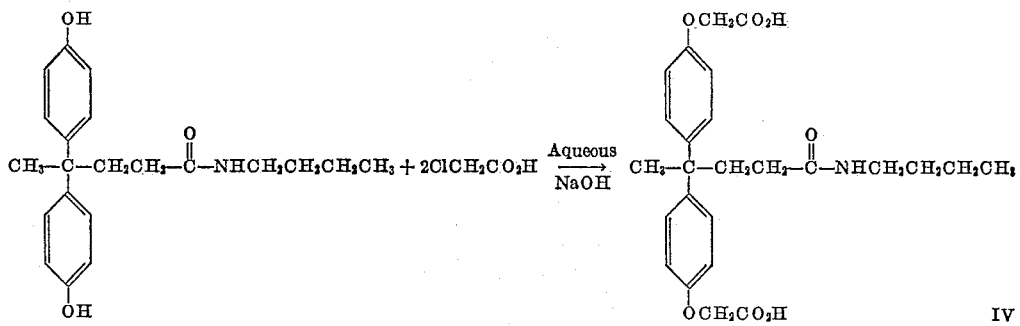

Although the reactions are usually carried out in an aqueous alkali solution and the resulting polycarboxylic acid precipitated by acidification at the end of the reaction period, some caution must be used in the acidification to avoid breaking the amide. The removal of salt may be carried out by washing with hot water. It may sometimes be desirable to conduct the reaction in the presence of organic solvents or a mixture of an organic solvent and water. Temperatures suitable for the reaction are in the range of 65–110° C.

The substituted acids suitable for use in preparing the instant polycarboxylic acids include aliphatic monohalo acids in which the halogen group is attached to a carbon of the alkyl chain. The alpha-monochloro compounds are usually preferred due to their greater commercial availability and since they readily react in a Williamson ether synthesis with fewer side products being formed. The beta- and gamma-halo acids, for example, tend to dehydrohalogenate in the presence of alkali, resulting in lower yields than are obtained from the corresponding alpha-halogen acids. Compounds which are illustrative and particularly advantageous in reactions with the Diphenolic Acid to give the subject polycarboxylic acids are chloroacetic acid and alphachloropropionic acid. Other exemplary acids are 2-chlorocaprylic and 5-bromovaleric acids. Epoxy acids such as the glycidic acid, 6,7-epoxy heptanoic acid may also be used but from an industrial standpoint, the monohalo acids are preferred. If an epoxy acid is used, the epoxy group will react directly with the hydroxy group without the necessity of forming the alkali phenoxide.

In the preparation of these subject polycarboxylic acid amides it is to be appreciated that there may be some free amine groups in the final composition and also that it may be desirable to etherify only a part of the phenolic hydroxyl groups of the parent amide with the substituted monocarboxylic acid, thereby obtaining a composition having free phenolic hydroxyl groups as well as carboxyl groups. Such compounds are also valuabe as intermediates in resin manufacture.

A more complete description of the amides suitable for use in preparing the polycarboxylic acids herein described will be found in the Greenlee copending applications, Serial Nos. 507,138, 564,886, and 505,552, filed May 9, 1955, February 13, 1956, and May 2, 1955, respectively. Examples I through VII, inclusive, describe the preparation of a selective group of such amides. The proportions given are expressed as parts by weight unless otherwise indicated. Acid values represent the number of milligrams of KOH required to neutralize a 1-gram sample. Amine values represent the number of milligrams of HCl required to neutralize a 1-gram sample. The amine and acid values were determined by electrometric titration. Softening points were determined by Durrans' Mercury Method (Journal of Oil and Color Chemists' Association, 12, 173–175 [1929]).

EXAMPLE I 572 parts DPA were charged to a 1-liter 4-necked fluted flask equipped with thermometer, stirrer, reflux condenser, and dropping funnel. Heat was applied using an electric heating mantle. 70 parts ethylenediamine, as an 86% aqueous solution, was charged to the dropping funnel. When the DPA was melted, a dropwise addition of ethylenediamine was begun with continuous stirring of reactants. Sufficient heat was maintained to keep the DPA molten. After all the ethylenediamine was added, approximately 30 minutes, a water trap was inserted in the system and the temperature raised to 230° C. Water was being removed during this time. The temperature was held at 230° C. for 5 hours and 40 minutes. The final product had an acid value of 10.7, an amine value of 24.9, and a softening point of 124° C.

EXAMPLE II

In a 3-necked flask provided with thermometer, mechanical agitator, and reflux condenser attached through a water trap was placed a mixture of 573 parts of 4,4-bis(4-hydroxyphenyl)pentanoic acid and 540 parts of octadecylamine. The reaction mixture was heated for a period of 25 hours at 150–175° C. with continuous agitation. An additional 37 parts of octadecylamine were added and heating continued at 150–175° C. for a period of 8 hours. The pressure during the last 30 minutes of heating was reduced to 60 mm. The product amounting to 1,087 parts had an acid value of 3.2, an amine value of 1.1 and a softening point of 142° C.

EXAMPLE III

In a pressure autoclave provided with a mechanical agitator and a thermometer was placed a mixture of 1145 parts of 4,4-bis(4-hydroxyphenyl)pentanoic acid and 585 parts of n-butyl amine. The autoclave was closed and with continuous agitation the mixture heated for 2 hours at 170–180° C. The reaction mixture was then allowed to cool, and the unreacted butyl amine and water were removed by distillation while heating the reaction mixture at 173° C. at a reduced pressure of 20 mm. The product, amounting to 1090 parts, had an acid value of 0, an amine value of 1.1, and a softening point of 175° C.

EXAMPLE IV

Using the apparatus of Example II, a mixture of 1145 parts of 4,4-bis(4-hydroxyphenyl)pentanoic acid and 585 parts of octylamine was heated for a period of 15 hours at 190–210° C. An additional 47 parts of octylamine were added and heating continued for another 12 hours at 190° C. Low molecular weight material was then removed by vacuum distillation at 20 mm. pressure, heating the reaction mixture at 190° C. The product, amounting to 1329 parts, had a softening point of 65° C., an amine value of 2.2, and an acid value of 0.

EXAMPLE V

In a 2-liter 3-necked flask equipped with thermometer, stirrer, and reflux condenser was placed 286 parts DPA and 80 parts hexamethylenediamine as a 70% aqueous solution. Upon incorporation of a suitable trap between the condenser and the flask water was distilled from the reaction mixture during a period of 96 minutes. The flask temperature rose to 252° C., 36 parts of water were isolated, and when no more distillate could be obtained, the resultant product, 326 parts of the diamide of 4,4-bis(4-hydroxyphenyl)pentanoic acid and hexamethylenediamine, was isolated. It had an amine value of 10.5, an acid value of 0, and a softening point of 83° C.

EXAMPLE VI

Using the apparatus employed in Example II, a mixture of 573 parts of 4,4-bis(4-hydroxyphenyl)pentanoic acid and 205 parts of aniline was heated for 12 hours at 180° C. The temperature was then gradually increased to 190° C. over a 1-hour period. The water trap was then filled with cyclohexane, and the reaction mixture refluxed for 2 hours at a reaction temperature of 170–180° C. with the removal of water from the reaction mixture. Final stripping of the reaction mixture was done at a temperature of 180° C. and at a pressure of 60 mm. for 1 hour, resulting in the isolation of 701 parts of the anilide of 4,4-bis(4-hydroxyphenyl)pentanoic acid having a softening point of 107° C., an amine value of 0, and acid value of 7.75.

EXAMPLE VII 572 parts DPA were charged to a 1-liter 4-necked fluted flask equipped with thermometer, stirrer, reflux condenser, and dropping funnel. Heat was applied with an electric heating mantle. 146 parts triethylenetetramine were charged to the dropping funnel. When the DPA was melted, dropwise addition of ethylenediamine was begun with continuous stirring. Sufficient heat was maintained to keep the DPA molten. After all the triethylenetetramine had been added, approximately 1 hour, a water trap was inserted in the system and temperature raised to 230° C. Water was being removed during this time. The temperature was held at 230° C. for 6 hours. The final reaction product had an acid value of 0, an amine value of 84.9, and a softening point of 116° C.

Examples VIII through XIV illustrate the preparation of polycarboxylic acids by the reaction of Diphenolic Acid amides with halo aliphatic organic acids. The quantities of materials given are parts by weight unless otherwise indicated.

EXAMPLE VIII

In a flask equipped with a mechanical stirrer, a reflux condenser, and a thermometer was placed 149 parts of the Diphenolic Acid amide of Example I. Then 40 parts of sodium hydroxide dissolved in 200 parts of water were added slowly. The preparation of a solution of chloroacetic acid in 40 parts of sodium hydroxide and 200 parts of water was made at 20° C. to avoid hydrolysis before being used in the reaction. With continuous agitation the reaction mixture was held at 82–85° C. for 2 hours and 20 minutes. The reaction mixture was neutralized to a pH of 4.2 with concentrated HCl and held at this pH with continuous agitation for a period of 1 hour. After removing the mother liquor, the resulting product was washed 3 times with hot water and the last traces of water removed by heating to 130° C. The product had an acid value of 175 and a softening point of 92° C.

EXAMPLE IX

By the same procedure as that used in Example VIII, 134 parts of the Diphenolic Acid amide of Example II, 60 parts of sodium hydroxide in 100 parts of water, and 300 parts of dioxane were treated with 142 parts of monochloroacetic acid dissolved in 60 parts of sodium hydroxide and 200 parts of water. The product had an acid value of 144.

EXAMPLE X

As in Example VIII, treatment of 85 parts of the Diphenolic Acid amide of Example III dissolved in 21 parts of sodium hydroxide and 150 parts of water with 48 parts of monochloroacetic acid dissolved in 20 parts of sodium hydroxide and 150 parts of water gave a product having an acid value of 170.

EXAMPLE XI

As in Example VIII, treatment of 99 parts of the Diphenolic Acid amide of Example IV dissolved in 61 parts of sodium hydroxide and 175 parts of water with 141 parts of monochloroacetic acid dissolved in 61 parts of sodium hydroxide and 200 parts of water gave a product having an acid value of 160.

EXAMPLE XII

As in Example VIII, treatment of 163 parts of the Diphenolic Acid amide of Example V dissolved in 51 parts of sodium hydroxide and 150 parts of water with 118 parts of monochloroacetic acid dissolved in 51 parts of sodium hydroxide and 200 parts of water gave a product having an acid value of 210.

EXAMPLE XIII

As in Example VIII, treatment of 126 parts of the Diphenolic Acid amide of Example VI dissolved in 41 parts of sodium hydroxide and 150 parts of water with 94.5 parts of monochloroacetic acid dissolved in 41 parts of sodium hydroxide and 200 parts of water give a product having an acid value of 158.

EXAMPLE XIV

Treatment as in Example VIII of 170.5 parts of the Diphenolic Acid amide of Example VII dissolved in 61 parts of sodium hydroxide and 150 parts of water with 142 parts of monochloroacetic acid dissolved in 61 parts of sodium hydroxide and 200 parts of water gave a product having an acid value of 215.

Illustrative of the epoxide compositions which may be employed in this invention are the complex epoxide resins which are polyether derivatives of polyhydric phenols with such polyfunctional coupling agents as polyhalohydrins, polyepoxides, or epihalohydrins. These compositions may be described as polymeric polyhydric alcohols having alternating aliphatic chains and nuclei connected to each other by ether linkages, containing terminal epoxide groups and free from functional groups other than epoxide and hydroxyl groups. It should be understood that significant amounts of the monomeric reaction products are often present. This would be illustrated by Ia to IIIa below where $n$ equals zero. Preparation of these epoxide materials, as well as illustrative examples, are described in U. S. Patents 2,456,408, 2,503,726, 2,615,007, 2,615,008, 2,688,805, 2,668,807, and 2,698,315. Well-known commercial examples of these resins are the Epon resins marketed by the Shell Chemical Corporation. Illustrative of the preparation of these epoxide resins are the following reactions wherein the difunctional coupling agent is used in varying molar excessive amounts.

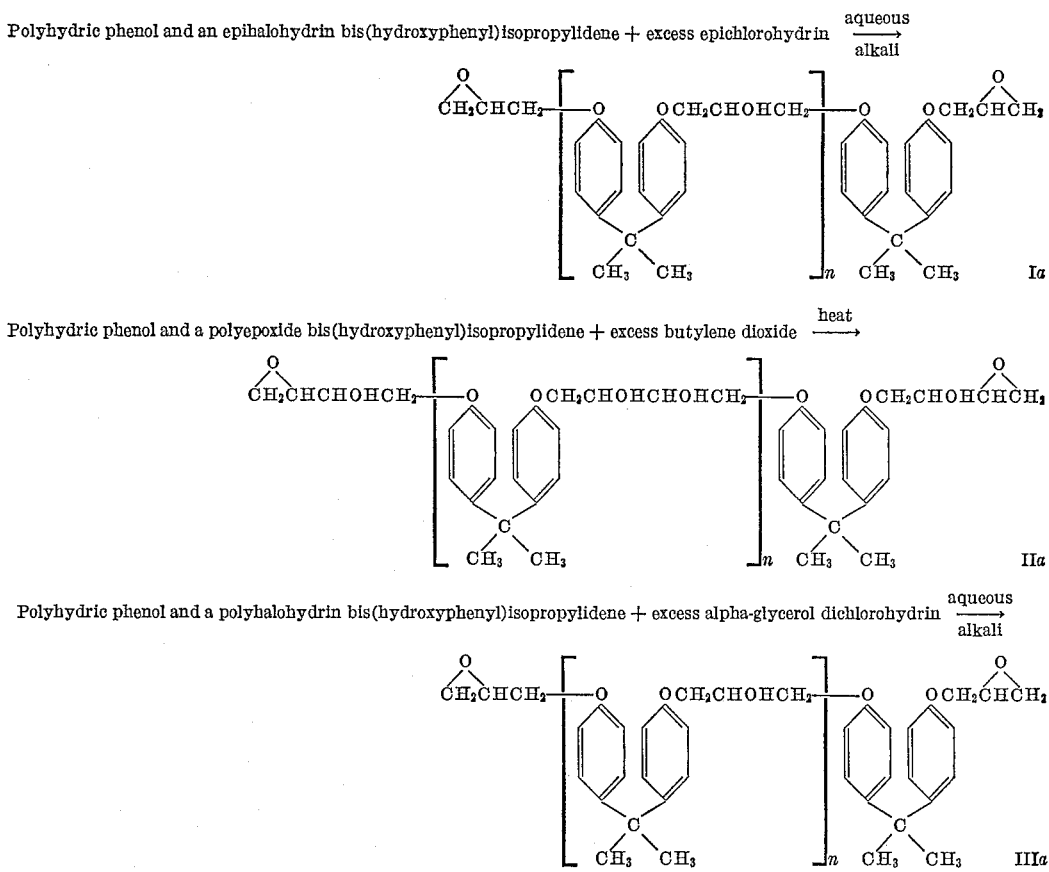

As used in the above formulas, $n$ indicates the degree of polymerization, said polymerization dependent on the molar ratio of reactants. As can be seen from these formulas, the complex epoxide resins used in this invention contain terminal epoxide groups and alcoholic hydroxyl groups attached to the aliphatic portions of the resin, the latter being formed by the splitting of epoxide groups in the reaction of the same with phenolic hydroxyl groups. Ultimately, the reaction with the phenolic hydroxyl groups of the polyhydric phenols is generally accomplished by means of epoxide groups formed from halohydrins by the loss of hydrogen and halogen as shown by the following equation:

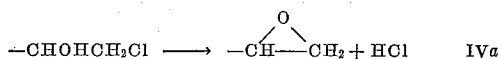

Other epoxide compositions which may be used include the polyepoxide polyesters which may be prepared by esterifying tetrahydrophthalic anhydride with a glycol and epoxidizing the product of the esterification reaction. In the preparation of the polyesters, tetrahydrophthalic acid may also be used, as well as the simple esters of tetrahydrophthalic acid such as dimethyl and diethyl esters. There is a tendency with tertiary glycols for dehydration to occur under the conditions used for esterification so that generally the primary and secondary glycols are the most satisfactory in the polyester formation. Glycols which may be used in the prepartion of this polyester composition comprise, in general, those glycols having 2 hydroxyl groups attached to separate carbon atoms and free from functional groups which would interfere with the esterification or epoxidation reactions. These glycols include such glycols as ethylene glycol, diethylene glycol, triethylene glycol, tetramethylene glycol, propylene glycol, polyethylene glycol, neopentyl glycol, and hexamethylene glycol. Polyepoxide polyesters may be prepared from these polyesters by epoxidizing the unsaturated portions of the tetrahydrophthalic acid residues in the polyester composition. By properly proportioning reactants in the polyester formation and regulating the epoxidation reaction, polyepoxides having up to 12 or more epoxide groups per molecule may be readily prepared. These polyepoxide polyester compositions as well as their preparation are more fully described in a copending application having Serial No. 503,323, filed April 22, 1955.

Polyepoxide compositions useful in this invention also include the epoxidized unsaturated natural oil acid esters, including the unsaturated vegetable, animal, and fish oil acid esters made by reacting these materials with various oxidizing agents. These unsaturated oil acid esters are long-chain aliphatic acid esters containing from about 15 to 22 carbon atoms. These acids may be esterified by simple monohydric alcohols such as methyl, ethyl, or decyl alcohol, by polyhydric alcohols such as glycerol, pentaerythritol, polyallyl alcohol, or resinous polyhydric alcohols. Also suitable are the mixed esters of polycarboxylic acids and long-chain unsaturated natural oil acids with polyhydric alcohols, such as glycerol and pentaerythritol. These epoxidized oil acid esters may contain more than 1 up to 20 epoxide groups per molecule. The method of epoxidizing these unsaturated oil acid esters consists of treating them with various oxidizing agents, such as the organic peroxides and the peroxy acids, or with one of the various forms of hydrogen peroxide. A typical procedure practiced in the art consists of using hydrogen peroxide in the presence of an organic acid, such as acetic acid and a catalytic material, such as sulfuric acid. More recently epoxidation methods have consisted of replacing the mineral acid catalyst with a sulfonated cation exchange material, such as the sulfonated copolymer of styrene divinylbenzene.

The epoxide compositions which may be used in preparing the compositions of this invention also include aliphatic polyepoxides which may be illustrated by the products obtained by polymerizing allyl glycidyl ether through its unsaturated portion as illustrated by the following:

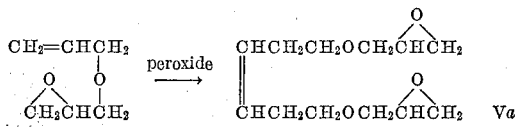

This reaction may be carried further to give higher polymers than the dimer shown. Other aliphatic polyepoxides useful in this invention may be illustrated by the poly(epoxyalkyl) ethers derived from polyhydric alcohols. These materials may, in general, be prepared by reacting an aliphatic polyhydric alcohol with an epihalohydrin in the presence of a suitable catalyst and in turn dehydrohalogenating the product to produce the epoxide composition. The production of these epoxides may be illustrated by the reaction of glycerol with epichlorohydrin in the presence of boron trifluoride followed by dehydrohalogenation with sodium aluminate as follows:

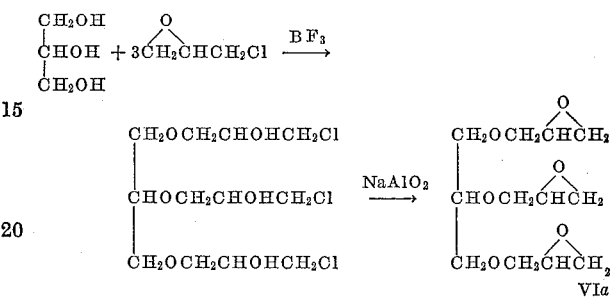

It is to be understood that such reactions do not give pure compounds, and that the halohydrins formed and the epoxides derived therefrom are of somewhat varied character depending upon the particular reactants, their proportions, reaction time and temperature. In addition to epoxide groups, the epoxide compositions may be characterized by the presence of hydroxyl groups and halogens. Dehydrohalogenation affects only those hydroxyl groups and halogens which are attached to adjacent carbon atoms. Some halogens may not be removed in this step in the event that the proximate carbinol group has been destroyed by reaction with an epoxide group. These halogens are relatively unreactive and are not to be considered as functional groups in the conversion of the reaction mixtures of this invention. The preparation of a large number of these mixed polyepoxides is described in the Zech Patents, U.S. 2,538,-072, 2,581,464, and 2,712,000. Still other polyepoxides which have been found to be valuable are such epoxide compositions as diepoxy butane, diglycid ether, and epoxidized polybutadiene.

Immediately following will be a description or illustration of preparations of polyepoxides which will be used in examples of compositions of this invention.

The complex resinous polyepoxides used in the examples and illustrative of the commercially prepared products of this type are the Epon resins marketed by Shell Chemical Corporation. The following table gives the properties of some Epon resins which are prepared by the condensation in the presence of alkali of bis(4-hydroxyphenyl)isopropylidene with a molar excess of epichlorohydrin in varying amounts.

| Epon Resin Type | Melting Point, °C. | Viscosity [1] (Gardner-Holdt) | Epoxide Equivalent | Average Molecular Weight |
|---|---|---|---|---|
| Epon 864 | 40–45 | A₁—B | 325 | 450 |
| Epon 1001 | 64–76 | C—G | 480 | 640 |
| Epon 1004 | 95–105 | Q—U | 870 | 1,133 |
| Epon 1007 | 127–133 | Y—Z₁ | 1,750 | |

[1] Based on 40% nonvolatile in butyl carbitol at 25° C.

Examples XV through XVII describe the preparation of typical polyepoxide polyesters.

EXAMPLE XV

*Preparation of polyester from tetrahydrophthalic anhydride and ethylene glycol*

In a 3-necked flask provided with a thermometer, mechanical agitator, and a reflux condenser attached through a water trap was placed a mixture of 3 mols of tetrahydrophthalic anhydride and 2 mols of n-butanol, After melting the tetrahydrophthalic anhydride in the presence of the butanol, 2 mols of ethylene glycol were added. The reaction mixture was gradually heated with agitation to 225° C. at which point a sufficient amount of xylene was added to give refluxing at esterification temperature. The reaction mixture was then heated with continuous agitation at 225—235° C. until an avid value of 4.2 was obtained. This product gave an iodine value of 128.

*Epoxidation of the polyester resin*

In a 3-necked flask provided with a thermometer, a mechanical agitator, and a reflux condenser was placed 107 parts of the dehydrated acid form of a cation exchange resin (Dowex 50–X–8, 50–100 mesh, Dow Chemical Company, a sulfonated styrene-divinylbenzene copolymer containing about 8% divinylbenzene, the percent divinylbenzene serving to control the amount of cross-linkage. The Dowex resins are discussed in publications entitled "Ion Exchange Resins No. 1" and "Ion Exchange Resins No. 2," copyright 1954 by Dow Chemical Company, the publications having form number Sp32–254 and Sp31–354, respectively) and 30 parts glacial acetic acid. The mixture of cation exchange resin and acetic acid was allowed to stand until the resin had completely taken up the acid. To this mixture was added 200 parts of the polyester resin dissolved in an equal weight of xylene. To the continuously agitated reaction mixture was added dropwise over a period of 45 minutes to 1 hour, 75 parts of 50% hydrogen peroxide. The reaction temperature was held at 60° C. requiring the application of some external heat. (In some preparations involving other polyester resins, sufficient exothermic heat is produced during the addition of hydrogen peroxide so that no external heat is required or even some external cooling may be required.) The reaction was continued at 60° C. until a milliliter sample of the reaction mixture analyzed less than 1 milliliter of 0.1 N sodium thiomulfate in an iodometric determination of hydrogen peroxide. The product was then filtered, finally pressing the cation exchange resin filter cake. The acid value of the total resin solution was 42. The percent nonvolatile of this solution amounting to 400 parts was 50. This 400 parts of solution was thoroughly mixed with 110 parts of the dehydrated basic form of Dowex 1 (an anion exchange resin of the quaternary ammonium type. Dowex 1 is a styrene-divinylbenzene copolymer illustrated by the formula RR'$_3$N+OH− where R represents the styrene-divinylbenzene matrix and R' is a methyl group, manufactured by the Dow Chemical Company). The resulting mixture was then filtered followed by pressing as much of the solution as possible from the anion exchange resin cake. This product had an acid value of 4.5 and an epoxide equivalent of 288 based on a nonvolatile resin content of 42.0%. The epoxide values as discussed herein were determined by refluxing for 30 minutes a 2-gram sample with 50 milliliters of pyridine hydrochloride in excess pyridine. (The pyridine hydrochloride solution was prepared by adding 20 milliliters of concentrated HCl to a liter of pyridine.) After cooling to room temperature, the sample is then back-titrated with standard alcoholic sodium hydroxide.

EXAMPLE XVI

Following the procedure of Example XV, a polyester resin was prepared from 5 mols of tetrahydrophthalic anhydride, 4 mols of diethylene glycol, and 2 mols of n-butanol. This product had an acid value of 5.3 and an iodine value of 107. This polyester resin was epoxidized in the manner previously described to give an epoxide equivalent weight of 371 on the nonvolatile content. The nonvolatile content of this resin solution as prepared was 40.2%.

EXAMPLE XVI

The process of Example XV was followed to obtain a polyester resin from 1.1 mols of tetrahydrophthalic anhydride, 1 mol of 1,4-butanediol and 0.2 mol of n-butanol. The product had an acid value of 8.6. This polyester resin was epoxidized in the same manner to give an epoxide equivalent weight of 292 and an acid value of 5.2 on the nonvolatile content. The nonvolatile content of this resin solution was 41.9%.

Examples XVIII and XIX describe the preparation of epoxidized vegetable oil acid esters.

EXAMPLE XVIII

*Epoxidized soyabean oil acid modified alkyd resin*

*a. PREPARATION OF ALKYL RESIN*

To a kettle provided with a condenser was added 290 parts white refined soyabean oil. While bubbling a continuous stream of nitrogen through this oil, the temperature was raised to 250° C., at which temperature 0.23 part of litharge was added and the temperature held at 250° C. for 5 minutes. While holding the temperature above 218° C., 68 parts of technical pentaerythritol was added after which the temperature was raised to 238° C. and held until a mixture of 1 part of the product and 2½ parts of methyl alcohol showed no insolubility (about 15 minutes). At this point 136 parts of phthalic anhydride were added and the temperature gradually raised to 250° C. and held at this temperature for 30 minutes. At this point the condenser was removed from the kettle and the pressure reduced somewhat by attaching to a water aspirator evacuating system. With continuous agitation the mixture was held at 250° C. until the acid value had reached 10.5. At this point the resin was thinned with xylene to 48% nonvolatile content having a viscosity of H (Gardner bubble viscosimeter).

*b. EPOXIDATION OF A SOYABEAN OIL ACID MODIFIED ALKYL RESIN*

In a 3-necked flask provided with a thermometer, a mechanical agitator and a reflux condenser was placed 70 parts of dehydrated acid form of a cation exchange resin (Dowex 50–X–8) and 15 parts glacial acetic acid. The mixture of cation exchange resin and acetic acid was allowed to stand until the resin had completely taken up the acid. To this mixture was added 315 parts of the alkyd resin solution described in the above paragraph and 190 parts of xylene. To the continuously agitated reaction mixture was added dropwise 38 parts of 50% hydrogen peroxide. The reaction temperature was held at 60° C. until a milliliter sample of the reaction mixture analyzed less than one milliliter of 0.1 N sodium thiosulfate in an iodometric determination of hydrogen peroxide. The product was then filtered, finally pressing the cation exchange resin filter cake. The epoxide equivalent on the nonvolatile content was 475.

In order to remove the free acidity from the epoxidized product, 400 parts of the solution were thoroughly mixed with 110 parts of the dehydrated basic form of Dowex 1 (an amine type anion exchange resin). The resulting mixture was then filtered, followed by pressing as much of the solution as possible from the anion exchange resin cake.

EXAMPLE XIX

*Epoxidized soyabean oil*

Admex 710, an epoxidized soyabean oil having an equivalent weight to an epoxide of 263, was dissolved in methyl ethyl ketone to a nonvolatile content of 50%. Admex 710, a product of the Archer-Daniels-Midland Company, has an acid value of 1, a viscosity of 3.3 stokes at 25° C. and an average molecular weight of 937.

Examples XX and XXI describe the preparation of simple aliphatic polyepoxides.

EXAMPLE XX

In a reaction vessel provided with a mechanical stirrer and external cooling means was placed 276 parts of glycerol and 828 parts of epichlorohydrin. To this reaction mixture was added 1 part of 45% boron trifluoride ether solution diluted with 9 parts of ether. The reaction mixture was agitated continuously. The temperature rose to 50° C. over a period of 1 hour and 45 minutes at which time external cooling with ice water was applied. The temperature was held between 50 and 75° C. for 1 hour and 20 minutes. To 370 parts of this product in a reaction vessel provided with a mechanical agitator and a reflux condenser was added 900 parts of dioxane and 300 parts of powdered sodium aluminate. With continuous agitation this reaction mixture was gradually heated to 92° C. over a period of 1 hour and 50 minutes and held at this temperature for 8 hours and 50 minutes. After cooling to room temperature, the inorganic material was removed by filtration. The dioxane and low boiling products were removed by heating the filtrate to 205° C. at 20 mm. pressure to give a pale yellow product. The epoxide equivalent of this product was determined by treating a 1-gram sample with an excess of pyridine containing pyridine hydrochloride (made by adding 20 cc. of concentrated hydrochloric acid per liter of pyridine) at the boiling point for 20 minutes and back-titrating the excess pyridine hydrochloride with 0.1 N sodium hydroxide using phenolphthalein as indicator and considering one HCl as equivalent to one epoxide group. The epoxide equivalent on this product was found to be 152.

EXAMPLE XXI

In a 3-necked flask provided with a thermometer, a mechanical agitator, a reflux condenser and a dropping funnel was placed 402 parts of allyl glycidyl ether. With continuous agitation the temperature was raised to 160° C. at which time one part of a solution of methyl ethyl ketone peroxide dissolved in diethyl phthalate to a 60% content was added. The temperature was held at 160–165° C. for a period of 8 hours, adding one part of the methyl ethyl ketone peroxide solution each 5 minutes during this 8-hour period. After the reaction mixture had stood overnight, the volatile ingredients were removed by vacuum distillation. The distillation was started at 19 mm. pressure and a pot temperature of 26° C. and volatile material finally removed at a pressure of 3 mm. and a pot temperature of 50° C. The residual product had a molecular weight of 418 and equivalent weight to epoxide content of 198, the yield amounting to 250 parts.

In preparing the compositions of this invention, the polycarboxylic acids and polyepoxides are usually admixed in suitable proportions either in the presence or absence of a compatible inert organic solvent, the reaction being effected by heating the mixtures at elevated temperatures, usually in the range of about 100–200° C. In instances where a solvent is used, the reaction may be allowed to proceed in varying stages. For example, if the final composition is to be a coating, the polyepoxide and polycarboxylic acid may be dissolved in a suitable solvent and applied as a solution, and subsequently reacted directly by the application of heat to an insoluble, infusible coating. Alternatively, after the application, the coating may be allowed to air-dry to a substantially tack-free finish which can then be converted to an insoluble, infusible composition at a later time by the simple application of heat.

In instances where the final composition is to be an adhesive, low melting or syrupy polyepoxides may be used with a low melting polycarboxylic acid amide. For various other applications, higher melting compositions are desirable, in which case partially polymerized mixtures of the polyepoxide and the polycarboxylic acid amide could advantageously be used. An alternative method for obtaining the higher melting compositions is to choose higher melting forms of the polyepoxide and polycarboxylic acid.

In making the new compositions and products herein disclosed, the polyepoxides and polycarboxylic acid amides may be used in regulated proportions without the addition of other materials, or for certain uses, other components may advantageously be added. Such additives include pigments, fillers, plasticizers, catalysts, etc. For example, even though the addition of an external plasticizer is usually unnecessary since a wide variation in flexibility can be achieved by a judicious selection of the polyepoxide and polycarboxylic acid, it may be desirable to use a plasticizer to supplement the flexibility of a specific composition. In other instances, although the reaction usually proceeds readily without a catalyst on the application of heat, it may be desirable to accelerate the reaction by the use of a catalyst. Such catalysts as sodium alcoholate, sodium phenoxide, boron-trifluoride adducts, and mineral-acid type catalysts may be employed.

The compositions of this invention may be prepared by using widely varying ratios of the reactants. The quantities of reactants employed in a given instance will depend upon the characteristics desired in the final product. For example, if an alkali-sensitive coating is desired, an excess of polycarboxylic acid could be used, or for certain other applications it may be desirable to use a large amount of polyepoxide to increase the chemical resistance. In still other instances, flexibility may be increased in a given composition by employing a hard polycarboxylic acid and a relatively large amount of a linear long-chain epoxide. Alternatively, flexibility may be imparted by larger amounts of a soft polycarboxylic acid. In general, while a large excess of the polyepoxide or polycarboxylic acid may be applicable for specific applications, most often equivalent or near equivalent ratios of polyepoxide or polycarboxylic acid are employed. It has been found, therefore, that the 1:2 to 2:1 ratios give the best over-all characteristics, although ratios as high as 1:10 or 10:1 may be used. Equivalents as expressed herein refer to the weight of polyepoxide per epoxide group, in the instance of the polyepoxides, and the weight of the acid per carboxyl group, in the instance of the polycarboxylic acid.

The polymerization of mixtures of epoxide and polycarboxylic acid amides may involve several chemical reactions. It will be appreciated that the reactions involved are very complex and the extent to which each takes place will vary with the temperature and time of heat treatment and with the nature of the reactants employed. While it is not intended to be limited by any theoretical explanation of the exact nature of these reactions, it seems probable that conversion to the final polymeric products by reaction between the reactants described involves direct polymerization of the epoxide groups inter se, reaction of epoxide groups with active hydrogen-containing groups such as amide groups, phenolic hydroxyl groups and carboxyl groups, and esterification of the carboxyl groups of the polycarboxylic acid amide with alcoholic hydroxyl groups derived from the epoxide, all of which take place to some extent simultaneously in forming the final products.

Examples XXII through LVI, inclusive, illustrate the preparation of insoluble, infusible protective coating films from the polycarboxylic acids and polyepoxides. In the preparation of compositions where heat curing is used to form protective coating films, each of the resinous carboxylic acids was dissolved in either methyl ethyl ketone or dimethyl formamide to a nonvolatile content of 40–50%. The polyepoxides were dissolved in methyl ethyl ketone or xylene. Mixtures of the resinous polycarboxylic acid solutions with the polyepoxides were found to be stable for extended periods of time. Mixtures of the solutions were spread on panels with a .002" Bird applicator and the films were baked for periods of 30–60 minutes at 175° C. Proportions hereinafter expressed refer to parts by weight and are based on the nonvolatile content of the solution of reactants.

| Example No. | Parts of Polyepoxide | Parts of Polycarboxylic Acid | Baking Schedule, Min./°C. | Films Resistance Boiling Water | Films Resistance 5 Percent Aqueous NaOH at 25° C. |
|---|---|---|---|---|---|
| XXII | 7.6, Epon 1001 | 5.0, Ex. VIII | 30/175 | 25 min | 48 hrs. |
| XXIII | 6.9, Epon 1001 | 5.0, Ex. XI | 30/175 | 10 min | 24 hrs. |
| XXIV | 6.9, Epon 1001 | 5.0, Ex. XIII | 30/175 | 10 min | 168 hrs. |
| XXV | 9.3, Epon 1001 | 5.0, Ex. XIV | 30/175 | 7 hrs | 72 hrs. |
| XXVI | 11.5, Epon 1004 | 5.0, Ex. IX | 30/175 | 10 min | 168 hrs. |
| XXVII | 13.5, Epon 1004 | 5.0, Ex. X | 30/175 | 10 min | 168 hrs. |
| XXVIII | 16.8, Epon 1004 | 5.0, Ex. XII | 30/175 | 7 hrs | 168 hrs. |
| XXIX | 12.6, Epon 1004 | 5.0, Ex. XIII | 30/175 | 10 min | 168 hrs. |
| XXX | 13.9, Epon 1007 | 2.5, Ex. VIII | 30/175 | 10 min | 168 hrs. |
| XXXI | 13.5, Epon 1007 | 2.5, Ex. X | 30/175 | 10 min | 168 hrs. |
| XXXII | 17.0, Epon 1007 | 2.5, Ex. XIV | 30/175 | 25 min | 72 hrs. |
| XXXIII | 4.3, Epon 864 | 5.0, Ex. IX | 60/175 | 10 min | 48 hrs. |
| XXXIV | 4.8, Epon 864 | 5.0, Ex. XI | 60/175 | 10 min | 11 hrs. |
| XXXV | 6.3, Epon 864 | 5.0, Ex. XII | 30/175 | 7 hrs | 24 hrs. |
| XXXVI | 4.5, Ex. XV | 5.0, Ex. VIII | 30/175 | 7 hrs | 15 min. |
| XXXVII | 5.5, Ex. XV | 5.0, Ex. XIV | 30/175 | 7 yrs | 10 min. |
| XXXVIII | 4.7, Ex. XVI | 5.0, Ex. XI | 30/175 | 7 hrs | 10 min. |
| XXXIX | 6.2, Ex. XVI | 5.0, Ex. XII | 30/175 | 7 hrs | 10 min. |
| XL | 6.4, Ex. XVI | 5.0, Ex. XIV | 30/175 | 7 hrs | 10 min. |
| XLI | 4.3, Ex. XVII | 5.0, Ex. VIII | 30/175 | 7 hrs | 15 min. |
| XLII | 5.1, Ex. XVII | 5.0, Ex. XII | 30/175 | 7 hrs | 10 min. |
| XLIII | 3.9, Ex. XVII | 5.0, Ex. XIII | 60/175 | 7 hrs | 30 min. |
| XLIV | 4.1, Ex. XIX | 5.0, Ex. VIII | 30/175 | 7 hrs | 30 min. |
| XLV | 5.0, Ex. XIX | 5.0, Ex. XII | 45/175 | 7 hrs | 3 hrs. |
| XLVI | 3.7, Ex. XIX | 5.0, Ex. XIII | 30/175 | 10 min | 3 hrs. |
| XLVII | 7.4, Ex. XVIII | 5.0, Ex. X | 45/175 | 7 hrs | 4 hrs. |
| XLVIII | 6.9, Ex. XVIII | 5.0, Ex. XI | 45/175 | 7 hrs | 1 hr. |
| XLIX | 9.1, Ex. XVIII | 5.0, Ex. XII | 45/175 | 7 hrs | 4 hrs. |
| L | 6.9, Ex. XVIII | 5.0, Ex. XIII | 45/175 | 7 hrs | 48 hrs. |
| LI | 2.9, Ex. XX | 5.0, Ex. XII | 30/175 | 7 hrs | 10 min. |
| LII | 2.9, Ex. XX | 5.0, Ex. XIV | 30/175 | 7 hrs | 10 min. |
| LIII | 2.6, Ex. XXI | 5.0, Ex. IX | 30/175 | 7 hrs | 15 min. |
| LIV | 2.9, Ex. XXI | 5.0, Ex. XI | 30/175 | 7 hrs | 30 min. |
| LV | 3.8, Ex. XXI | 5.0, Ex. XII | 30/175 | 7 hrs | 10 min. |
| LVI | 2.9, Ex. XXI | 5.0, Ex. XIII | 30/175 | 7 hrs | 11 hrs. |

It should be appreciated that while there are above disclosed but a limited number of embodiments of this invention, it is possible to produce still other embodiments without departing from the inventive concept herein disclosed.

It is claimed and desired to secure by Letters Patent:

1. A composition of matter comprising the condensation product obtained by heating (A) a polycarboxylic acid amide obtained by heating in the presence of alkali (1) an amide of a pentanoic acid containing not more than 4 >NH groups, said pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms and (2) a monohalo, monocarboxylic saturated aliphatic acid containing from 2 to about 8 carbon atoms, the reaction of (1) and (2) occurring through the phenolic hydroxyl of the pentanoic acid and the halo groups of the monohalo acid, forming an ether bond and (B) a polyepoxide containing an average of more than one oxirane group per molecule wherein said polyepoxide is composed of the elements carbon, hydrogen and oxygen and having oxygen present only in the groups selected from the group consisting of —OH, —COO—, ethereal oxygen and oxirane groups; proportions of (A) to (B) being from 1:10 to 10:1 on an equivalent weight basis.

2. The composition of claim 1 wherein the proportions of (A) to (B) are from 1:2 to 2:1 on an equivalent weight basis.

3. The composition as described in claim 2 wherein the pentanoic acid of (A–1) consists essentially of 4,4 bis(4-hydroxyaryl)pentanoic acid wherein the hydroxyaryl radical is a hydroxyphenyl radical and is free from substituents other than alkyl groups of one carbon atom.

4. The composition as described in claim 2 wherein the pentanoic acid of (A–1) is 4,4 bis(4-hydroxyphenyl) pentanoic acid.

5. The composition as described in claim 4 wherein said acid (A–2) is mono-chloroacetic acid.

6. The composition as described in claim 4 wherein said acid (A–2) is alpha-chloropropionic acid.

7. The composition as described in claim 4 wherein (B) is a polyepoxide polyester of tetrahydrophthalic acid and a glycol wherein the epoxy oxygen bridges adjacent carbon atoms on the tetrahydrophthalic acid residue.

8. The composition as described in claim 4 wherein (B) is an aliphatic polyepoxide, said polyepoxide having only hydroxyl substituents in addition to oxirane groups.

9. The composition as described in claim 4 wherein (B) is an epoxidized vegetable oil acid.

10. The composition as described in claim 4 wherein (B) is an epoxidized fish oil acid.

11. The composition as described in claim 4 wherein the polyepoxide of (B) is a complex resinous epoxide which is a polymeric polyhydric alcohol having alternating aromatic nuclei and aliphatic chains united through ether oxygen and terminating in oxirane substituted aliphatic chains.

No references cited.

UNITED STATES PATENT OFFICE
CERTIFICATE OF CORRECTION

Patent No. 2,893,974                                   July 7, 1959

Sylvan O. Greenlee

It is hereby certified that error appears in the printed specification of the above numbered patent requiring correction and that the said Letters Patent should read as corrected below.

Column 2, line 38, for "4,4-bis(hydroxyphenyl)pentanoic acid" read -- 4,4-bis(4-hydroxyphenyl)pentanoic acid --; column 3, line 73, for "aryloxyl" read -- aryloxy --; column 11, line 7, for "avid" read -- acid --; line 39, for "thiomulfate" read -- thiosulfate --; column 12, line 1, for "EXAMPLE XVI" read -- EXAMPLE XVII --; lines 17 and 39, Example XVIII, in the headings designated "a" and "b", for "ALKYL", each occurrence, read -- ALKYD --; columns 15 and 16, in the table, fourth column thereof, in the heading, for "Baking Schedule, Min./° C." read -- Baking Schedule, Min./° C. --; same table, last column thereof, in the heading, for "5 Percent Aqueous NaOH at 25° C." read -- 5 Percent Aqueous NaOH at 25° C.--.

Signed and sealed this 17th day of May 1960.

(SEAL)
Attest:

KARL H. AXLINE                                                                 ROBERT C. WATSON
Attesting Officer                                                 Commissioner of Patents